Aug. 14, 1951  E. W. FAHEY  2,564,056
APPARATUS FOR HANDLING AND PACKAGING EGGS
Filed March 22, 1946  2 Sheets-Sheet 1
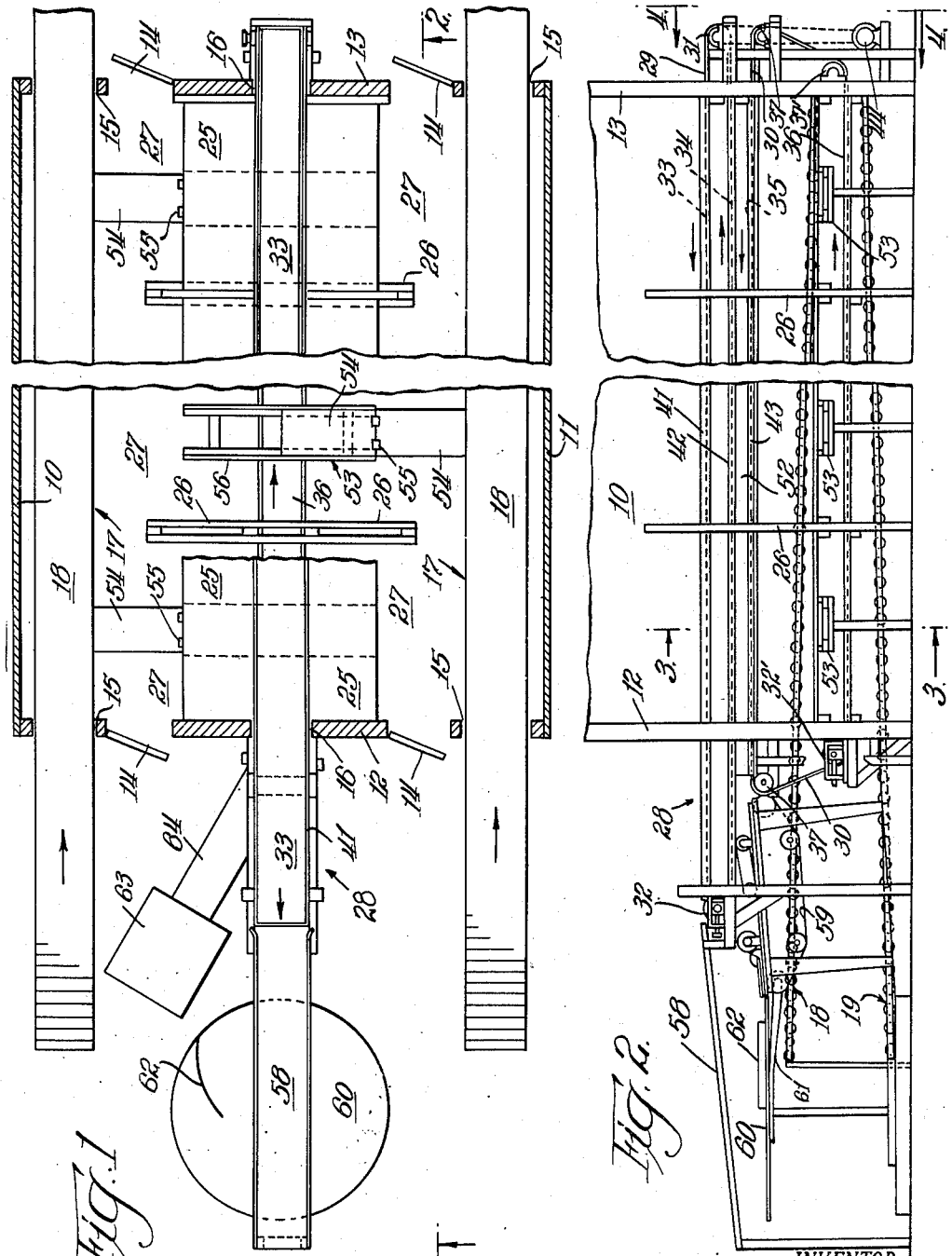
INVENTOR.
Edward W. Fahey
BY
Cromwell, Greist and Warden
Att'ys.

Aug. 14, 1951      E. W. FAHEY      2,564,056
APPARATUS FOR HANDLING AND PACKAGING EGGS
Filed March 22, 1946      2 Sheets-Sheet 2
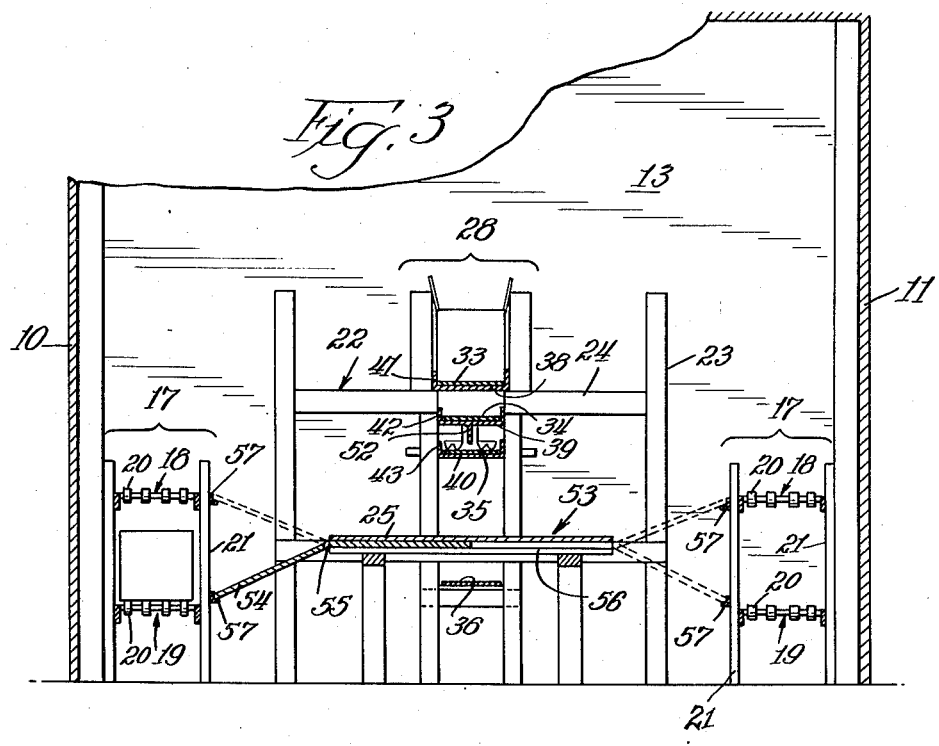
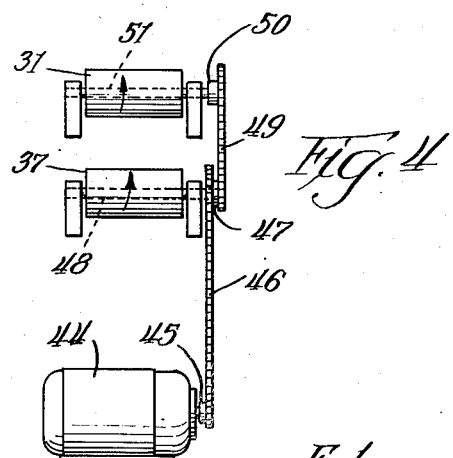
INVENTOR.
Edward W. Fahey
BY
Cromwell, Greist and Warden
Attys.

Patented Aug. 14, 1951

2,564,056

UNITED STATES PATENT OFFICE 2,564,056

APPARATUS FOR HANDLING AND PACKAGING EGGS

Edward W. Fahey, Chicago, Ill., assignor to Shellmar Products Corporation, Mount Vernon, Ohio, a corporation of Delaware Application March 22, 1946, Serial No. 656,486

10 Claims. (Cl. 198—19)

This invention pertains to an egg room and to egg handling apparatus or mechanism of the type to be used therein, for use where eggs are received, graded, cartoned and disposed of in large quantities.

Eggs are usually shipped and handled in relatively large cases containing 30 dozen eggs, each case and contents weighing about 50 pounds. Their shape and weight make their handling a difficult task for service personnel and egg candlers.

Ordinarily the eggs in the cases vary considerably as to size and quality and it is the candlers' function to grade the eggs in accordance with well defined standards. The greater portion of the eggs are packed in cartons, one dozen to a carton and the cartons are then repacked in the original cases, a single grade to a case, for ultimate shipment to retail outlets. In the course of candling some eggs are found which are unsuitable for cartoning, these being rots and blood spots, which are unfit for human consumption; dirties, i. e., those having soiled shell; and checks, i. e., those having damaged shells. The latter two grades are disposed of to outlets capable of using the same. It is customary for the candler to place the three uncartonable grades mentioned above in filler and flat assemblies, in accordance with their classification, until each such assembly is filled, then to place the same in an egg case, disposing of the case when filled.

Eggs must be candled in a relatively darkened area to permit the candler to properly view the contents of the egg under the beam of a candling light; hence such area must be almost entirely enclosed. Where grading is done in accordance with, say, five grades of cartoned eggs, it will be obvious that the candler has, in the past, been almost completely surrounded by egg cases, since a supply of ungraded eggs must be constantly available and individual cases must be at hand for packing each grade of cartoned eggs, as well as for packing each of the three grades of rejected eggs mentioned above, disposed in fillers and flats. A supply of cartons must also be always available.

As a result of the large number of grades into which eggs are divided in the candling operation and the necessity to have individual cases available for each grade, the efficiency of the candler is impaired. Egg candling is a skilled trade and a great deal of generally non-productive lifting, stooping, proper case selection, and the like involved in the above procedures impaired the skilled production efficiency of the candler substantially. Additionally, a large amount of space was necessary for each candling station or booth by reason of the multiplicity of cases required to be available to the candler.

The provision of increased service personnel to assure an adequate supply of ungraded eggs and egg cartons to the candler and to dispose of the filled cases has only partially solved the problem. The enclosed nature of the candling booth makes it difficult for the service personnel to determine when the candler needs a new supply of ungraded eggs, or cartons, or needs other service assistance. In short, where attempts have been made to solve these problems by the use of service personnel it is usually necessary to have nearly as many service persons as there are candlers. Furthermore, supervision of the candler is difficult under the conditions outlined above.

It is therefore an object of this invention to provide conveyor means for maintaining a constant supply of ungraded eggs and cartons easily accessible to each candler, thereby eliminating loss of time in waiting for a supply of such articles; to provide means whereby cases containing ungraded eggs may be removed from the conveyor and filled egg cases may be disposed of with a minimum of lifting, thereby reducing candlers' fatigue; and to provide means for disposal of the cartoned eggs in the individual cartons, thereby eliminating the necessity for retention of egg cases in the candling booth for packing in cases, and also permitting reduction of space required for each candler's station and compacting the egg room generally.

Another object is to provide apparatus of the above type enabling use of a common darkened area for a plurality of candlers.

A still further object is to provide for the introduction of line production methods in the egg room by provision of opposed rows of candling stations adjacent conveyors common to all such stations.

The foregoing statements are indicative in a general way of the nature of the invention, but other and more specific objects will be apparent to those skilled in the art upon a full understanding of the construction and operation of the device.

One embodiment of the invention is presented herein for purpose of exemplification, but it will be appreciated that the invention is susceptible of incorporation in other modified forms coming equally within the scope of the appended claims.

In the drawings,

Fig. 1 is a fragmentary diagrammatic plan view of an egg room embodying the invention, being broken longitudinally to shorten the showing and also being broken medially in a horizontal plane better to show certain of the parts;

Fig. 2 is a fragmentary side elevation of the showing of Fig. 1, taken along the line 2—2 thereof;

Fig. 3 is a fragmentary cross-sectional view taken substantially along the line 3—3 of Fig. 2; and Fig. 4 is a schematic view in elevation showing the drive means for the endless belts shown in the drawings.

Referring now to Fig. 1, the reference numerals 10 and 11 indicate opposed light excluding sides or walls and numerals 12 and 13 opposed indicate light excluding ends or walls of an egg room, access to which may be had through doorways closed by doors 14. The area thus enclosed may be considered as being of substantial length and of relatively small width.

Each of the ends or walls 12, 13 has a pair of laterally spaced openings 15 therein at an appropriate level to permit extension therethrough of the ends of conveyors 17 for filled egg cases, and has an intermediate opening 16 to permit extension therethrough of the ends of a conveyor means 28, both types of conveyor being hereinafter more fully described.

As shown in Figs. 1 and 3, filled egg case conveyors 17 are substantially identical and are positioned in spaced parallel relation to each other throughout their length. Each of said conveyors 17 consists of an upper run 18 and a lower run 19, each of said runs consisting of spaced rollers 20 borne by a framework 21. Runs 18, 19 are preferably in vertical alignment with one another throughout their length. For the purpose of this description said runs 18, 19 are considered as being inclined in opposite directions. However, in some instances it is desirable or necessary to have them inclined in a common direction.

Positioned medially of filled egg case conveyors 17 is a framework 22, comprising uprights 23 and cross struts 24 bracing the supports. At about table top height framework 22 bears a relatively wide, longitudinally extending, horizontal shelf 25.

As shown in Fig. 1, said framework 22 is intersected at regularly spaced intervals along its length and on each side by relatively short vertically extending partition wall sections 26 which define longitudinally spaced egg candling stations 27, the forepart of each of the stations being defined by a segment of shelf 25. The described construction provides two rows of egg candling stations arranged in opposed, face-to-face relation. This arrangement places oppositely disposed candlers, on either side of conveyor means 28, in position for easy, comfortable access to said conveyor means and conveniently served by the conveyors 17 to the rear of the candlers and inside the walls 10, 11.

The conveyor means 28 is positioned medially of framework 22, extending longitudinally of the latter throughout the major portion of the length thereof and above the level of shelves 25, and equally accessible to every candling station 27. Conveyor means 28 is shown as comprising two generally horizontally extending endless belts 29, 30.

As shown in Fig. 2, belt 29 is borne at one end by a pulley 31 and at its opposite end by an adjustable take-up pulley 32, both of which pulleys are mounted transversely on framework 22 so that the upper and lower runs 33, 34 of belt 29 are in closely spaced, substantially parallel relation throughout their length. Belt 30 is borne along its top run 35 by the pair of identical, oppositely positioned pulleys 37 mounted transversely of framework 22. The top run 35 of belt 30 is maintained in widely spaced relation to the bottom run 36 thereof, the latter passing, as shown, below the level of shelves 25 and having no conveying function. To this end belt 30 is trained downwardly to pass around a pulley 37' spaced substantially below pulley 37. A second adjustable take-up pulley 32' is disposed in horizontal coplanar relation to pulley 37'. It will be noted that the construction outlined immediately hereinabove provides three conveyor runs 33, 34, 35 in substantially spaced, parallel relation throughout a major portion of the length of each.

As shown in Fig. 3, belt runs 33, 34 and 35 are sustained along their lower surfaces by supporting surfaces 38, 39 and 40, respectively, the latter being mounted horizontally in and extending longitudinally of framework 22. For guidance and retention of articles conveyed on the aforementioned conveyor runs, upstanding side guides 41, 42 and 43 are provided laterally of each of said belt runs 33, 34 and 35.

Shown in Figs. 2 and 4 is the means for imparting movement to endless belts 29, 30, in the form of an electric motor 44, to the shaft of which is fixedly attached a chain sprocket 45 drivingly engaging an endless chain 46. Chain 46 drivingly engages one sprocket of a double sprocket 47 which is fixedly attached to a shaft 48 on which pulley 37 is fixedly mounted. The other sprocket of double sprocket 47 drivingly engages a second endless chain 49 in driving engagement with a sprocket 50 fixedly attached to shaft 51, on which pulley 31 is fixedly mounted. The arrangement outlined immediately hereinabove will be seen to rotate pulleys 31 and 37 in the same direction and to permit belt runs 33 and 35 carried thereby to move in a common direction, belt run 34 moving in an opposite direction.

Referring again to Fig. 3, a longitudinal divider 52 serves to define two parallel paths of travel on belt run 35, depending from the lower face of supporting surface 39 medially of the width of said run and extending longitudinally thereof.

A plurality of extensible shelf or chute means 53 is transversely positioned of framework 22, there being one of the latter for each pair of opposed candling stations. Each chute means 53 consists of two identical rectangular sections 54 hinged together in end-to-end relation by hinges 55, and each section, as particularly shown in Fig. 3, is freely swingable in a vertical plane with respect to the other, when the sections are laterally extended, between the positions shown in full and dotted lines in that figure. Side guides 56 similar to conventional drawer guides, serve to retain one section 54 in fixed relation to framework 22 when the other section is extended, and these guides also support both sections to slide transversely of framework 22 in a common horizontal plane 22, for use in a candling station at either side of the framework. Angle iron rests 57 are provided on framework 21 to support the ends of each section 54 in the operative extended position thereof, for use in transferring egg cases from or to conveyor runs 18 or 19.

An inclined chute 58 is positioned exteriorly of side or wall 12 with one of its ends in alignment with belt run 33 to receive articles discharged from said belt run. Below chute 58 and in alignment with the discharge end of belt run 35 is a motor driven carton closing machine 59 of the type shown in U. S. Patent 1,994,241 to Burger. Beyond the discharge end of the closing machine 59 is a rotary table 60 driven by a belt 61 which derives its movement from conventional power take-off mechanism attached to the carton closing machine. An arcuate sweep or diverter 62 extends in spaced relation to and across the top surface of rotary table 60 to shunt cartons discharged thereonto toward the center thereof from which they are removed.

A carton set-up machine of the type shown in U. S. Patent No. 2,018,396 to Burger is positioned angularly with respect to conveyor 28, its discharge chute 64 being upwardly inclined at an angle toward said conveyor to discharge set-up egg cartons onto belt run 34.

In operation, service personnel located exteriorly of side wall 12 place a number of egg cases filled with eggs packed in conventional fillers and flats on upper runs 18 of the roller conveyors 17, whence they are gravity conveyed in the direction of candling stations 27. At the same time other service personnel place a supply of knocked-down egg cartons in the hopper of carton set-up machine 63 and put the machine into operation. The operation of the set-up machine soon fills chute 64 with set-up cartons and forces such cartons up the chute incline onto conveyor run 34. Electric motor 44, being started, imparts movement to pulleys 31 and 37 through the mechanism shown in Fig. 4 and movement is by them transmitted to endless belts 29 and 30. Conveyor run 34 travels in the direction of candling stations 27 and empty egg cartons are thus carried to each candling station.

The egg candlers in stations 27 then may pull out rectangular chute 54 of chute means 53, raising the extended portion for support on topmost angle iron rests 57 and sliding a filled egg case down the incline of chute 54 to the level of shelves 25. After the candler on one side has used the chute means 53 in the manner set forth above the rectangular chute 54 may be released from topmost rest 57, bent down to horizontal position and slid transversely of framework 22 for use by the egg candler in the opposite station in the identical manner set forth.

Having received a supply of eggs for grading, the candler removes from belt run 34 a supply of empty egg cartons, and arranges such cartons on shelves 25 for use. The candler then proceeds to grade the eggs across the beam of a candling light (not shown) for internal quality, at the same time grading such eggs for size, color, etc.

Eggs suitable for carton pack are placed in cartons appropriate to the egg size and grade, and such cartons, when filled, are placed with covers open on that side of belt run 35 available to the candler, as shown in Fig. 3. It is customary for the chandler to temporarily retain in the egg candling station several egg cases from which the eggs have been removed. The filler and flat assemblies of such cases are filled with uncartonable eggs as they are detected during the course of the egg candling operation. When filled with uncartonable eggs such cases are transferred by the egg candler to conveyor run 19, again using chute means 53, with section 54 extended and lowered to the position shown in full lines in Fig. 3, and supported on lowermost angle iron rest 57. This type of filled egg case is preferably gravity conveyed in a direction opposite to that of filled egg cases going to the candler, the cases being removed from conveyor run 19 exteriorly of wall 12 by the same service personnel who load the filled ungraded cases on conveyor run 18.

When the egg candler wishes to dispose of egg cases which are completely emptied (except for the fillers and flats in which the eggs were originally packed) these empty egg cases are placed on conveyor run 33 by which they are transported to discharge on inclined chute 58.

As heretofore mentioned, cartoned eggs are placed on conveyor run 35. This run is divided by depending divider 52 into two paths of travel each being of such width that the cartons must be placed thereon with their longitudinal dimension extending longitudinally of the belt run. The cartons are preferably placed thereon not only with their covers open, but are preferably also positioned so that the open covers are in close juxtaposition to divider 52 as shown in Fig. 3. Placement of the cartons on conveyor run 35 in the described manner is desirable due to the fact that carton closer 59 is itself divided for travel of cartons therethrough in two paths of travel and is arranged to best accommodate and close cartons passing therethrough in back-to-back relation. In passing through carton closer 59, the tops of the egg cartons are folded down into covering relation to the carton bottoms and latched in closed position by hooks integral with the cover, in known manner. After being closed the cartons are discharged onto the top surface of rotary table 60.

Service persons working adjacent rotary table 60 may then remove empty egg cases from chute 58, empty the cases of such fillers and flats as may be therein, and pack cartons from rotary table 60 into the egg cases for disposal.

The positioning of the intake and discharge ends of conveyor runs 18, 19 of each conveyor 17 adjacent chute 58, rotary table 70 and carton set-up machine 63 makes for greater efficiency on the part of the service personnel in that a relatively small number of employees may handle the duties set forth above, without leaving the relatively small work area involved. The efficiency of the egg candler is also increased by reason of the fact that an adequate supply of eggs for grading and of cartons for packing the graded eggs are at all times easily accessible to such candler, without the necessity for waiting for service and thus making full use of the candler's productive time. Efficiency is further increased because only cases for disposal of uncartonable eggs need be retained in each candling station, the cases filled with such low grade eggs may be easily disposed of without great physical effort and the cartoned eggs may be disposed of as rapidly as the cartons are filled.

It is realized that many modifications may be made in the structure shown and described hereinabove, hence such disclosure is not to be taken as limiting, but rather as illustrative. I do not wish to be limited to the exact form or structure shown and described, except as I may be limited by the scope of the following claims.

I claim:

1. An article handling apparatus of the type described comprising a suport having means defining a row of work stations on either side thereof, means for conveying articles to be handled to and from said stations, said conveying means being disposed in the direction of the support and between said rows of stations, pairs of further, vertically spaced, longitudinally extending conveyors disposed in spaced relation to said stations on the respective sides thereof opposite said first named conveying means, and means common to each pair of stations of said respective rows for transferring articles between a station at either side of said support and a selected one of said further conveyors, said last named means comprising a transfer member and means to guide said member for movement on said support transversely thereof, said member having pivotally connected sections either of which is vertically swingable to operative relation to the selected further conveyor.

2. An article handling apparatus of the type described comprising an elongated support having means defining parallel rows of successive work stations spaced longitudinally on either side thereof, means arranged longitudinally of said support for conveying articles to be handled to and from said stations, said conveying means being disposed longitudinally of the support and extending parallel to and between said rows of stations, pairs of further, vertically spaced, longitudinally extending conveyors disposed in spaced relation to said rows of stations on the respective sides thereof opposite said first named conveying means, and means common to each pair of stations of said respective rows for transferring articles between a station at either side of said support and a selected one of said further conveyors, said last named means comprising a transfer member and means to guide said member for movement on said support transversely thereof, said member having pivotally connected sections either of which is vertically swingable to operative relation to the selected further conveyor.

3. An apparatus of the type described comprising a framework defining two parallel rows of work stations arranged in face-to-face relation, conveyor means arranged medially of said rows and extending longitudinally thereof to transport articles longitudinally of said stations, a pair of other conveyors extending parallel to said framework and rearwardly of said respective rows to transport articles longitudinally of said stations, and chute means common to a pair of opposed stations and adapted to extend between the framework and one or the other of said last named conveyors, said chute means being mounted for adjusting movement transversely of said framework and conveyors to enable positioning of the same between said framework and a selected one of said conveyors.

4. An apparatus of the type described comprising a framework, conveyor means extending longitudinally and substantially horizontally thereof, said framework defining a plurality of work stations arranged in rows alongside the conveyor means and facing the latter, said conveyor means being adapted to transport articles longitudinally of said work stations, a pair of conveyors each including a pair of vertically spaced article conveying runs disposed in parallel relation to said framework and rearwardly of the work stations, and chute means common to a pair of opposed stations, said chute means being mounted for selective adjustment transversely of said work stations into operative relation to one or the other of said last named conveyors and being vertically movable relative to the latter to extend in operative transfer relation between a work station and one or another run of a selected conveyor.

5. An article handling apparatus of the type described, comprising means defining parallel rows of longitudinally spaced work stations, each including a horizontal shelf, a pair of endless, continuously driven conveyors disposed to extend longitudinally of and between said work stations in vertically spaced relation to said shelves and in close lateral adjacency thereto for convenient access by operators at said stations, a pair of longitudinally extending conveyor devices disposed on opposite sides of said driven conveyors in rearwardly spaced relation to said respective rows of stations, a transfer device common to each of a pair of work stations on opposite sides of said first conveyors, and means mounting said transfer device for movement transversely of said conveyors and conveyor devices for selective use in conjunction with either of the latter.

6. An article handling apparatus of the type described, comprising means defining parallel rows of longitudinally spaced work stations, each including a horizontal shelf, a pair of endless, continuously driven conveyors disposed to extend longitudinally of and between said work stations in vertically spaced relation to said shelves and in close lateral adjacency thereto for convenient access by operators at said stations, a pair of longitudinally extending conveyor devices disposed on opposite sides of said driven conveyors in rearwardly spaced relation to said respective rows of stations, said devices each including a pair of vertically spaced runs, a transfer device common to each of a pair of work stations on opposite sides of said first conveyors, means mounting said transfer device for movement transversely of said conveyors and conveyor devices for selective use in conjunction with either of the latter, and means adapting said transfer device to be vertically adjusted in transfer relation to either of the runs of the selected conveyor device.

7. An article handling apparatus of the type described, comprising means defining parallel rows of longitudinally spaced work stations, each including a horizontal shelf, a pair of endless, continuously driven conveyors disposed to extend longitudinally of and between said work stations in vertically spaced relation to said shelves and in close lateral adjacency thereto for convenient access by operators at said stations, said conveyors including means coacting with the longitudinally extending runs thereof to afford at least three traveling, article conveying elements, a pair of longitudinally extending conveyor devices disposed on opposite sides of said multiple run conveyors in rearwardly spaced relation to said respective rows of stations, said devices each including a pair of vertically spaced runs, a transfer device common to each of a pair of work stations on opposite sides of said first conveyors, means mounting said transfer device for movement transversely of said conveyors and conveyor devices for selective use in conjunction with either of the latter, and means adapting said transfer device to be vertically adjusted in transfer relation to either of the runs of the selected conveyor device.

8. An article handling apparatus of the type described, comprising means defining parallel rows of longitudinally spaced work stations, each including a horizontal shelf, a pair of endless, continuosly driven conveyors disposed to extend longitudinally of and between said work stations in vertically spaced relation to said shelves and in close lateral adjacency thereto for convenient access by operators at said stations, said conveyors including means coacting with the longitudinally extending runs thereof to afford at least three traveling, article conveying elements, of which two of said elements travel in opposite directions, a pair of longitudinally extending conveyor devices disposed on opposite sides of said multiple run conveyors in rearwardly spaced relation to said respective rows of stations, said devices each including a pair of vertically spaced runs, a transfer device common to each of a pair of work stations on opposite sides of said first conveyors, means mounting said transfer device for movement transversely of said conveyors and conveyor devices for selective use in conjunction with either of the latter, and means adapting said transfer device to be vertically adjusted in transfer relation to either of the runs of the selected conveyor device.

9. An article handling apparatus of the type described comprising a support having means defining a row of work stations on either side thereof, means for conveying articles to be handled to and from said stations, said conveying means being disposed in the direction of the support and between said rows of stations, pairs of further, vertically spaced, longitudinally extending conveyors disposed in spaced relation to said stations on the respective sides thereof opposite said first named conveying means, and means common to each pair of stations of said respective rows, and mounted for selective movement transversely of said support and conveying means, for transferring articles between a station at either side of said support and a selected one of said further conveyors.

10. An article handling apparatus of the type described comprising an elongated support having means defining parallel rows of successive work stations spaced longitudinally on either side thereof, means arranged longitudinally of said support for conveying articles to be handled to and from said stations, said conveying means being disposed longitudinally of the support and extending parallel to and between said rows of stations, pairs of further, vertically spaced longitudinally extending conveyors disposed in spaced relation to said rows of stations on the respective sides thereof opposite said first named conveying means, and means common to each pair of stations of said respective rows, and mounted for selective movement transversely of said support and conveying means, for transferring articles between a station at either side of said support and a selected one of said further conveyors.

EDWARD W. FAHEY.

REFERENCES CITED

The following references are of record in the file of this patent:

UNITED STATES PATENTS

| Number | Name | Date |
| --- | --- | --- |
| 789,224 | Mandeville | May 9, 1905 |
| 866,868 | Kimerer | Sept. 24, 1907 |
| 1,125,237 | Whittier | Jan. 19, 1915 |
| 1,460,862 | Pieretti | July 3, 1923 |
| 1,558,014 | Jaenicke | Oct. 20, 1925 |
| 1,897,901 | Hagopian | Feb. 14, 1933 |
| 2,108,869 | Sandmeyer | Feb. 22, 1938 |
| 2,280,221 | Dambach | Apr. 21, 1942 |